(12) United States Patent
Chapman

(10) Patent No.: US 10,805,494 B1
(45) Date of Patent: Oct. 13, 2020

(54) MIRROR OF GLOSS EFFECT IMAGE OF GLOSS MARK RENDERED ON BACKSIDE OF MEDIUM

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/706,768

(22) Filed: Dec. 8, 2019

(51) Int. Cl.
*H04N 1/00* (2006.01)
*H04N 1/203* (2006.01)
*H04N 1/32* (2006.01)
*H04N 1/60* (2006.01)

(52) U.S. Cl.
CPC ....... *H04N 1/00883* (2013.01); *H04N 1/2034* (2013.01); *H04N 1/3232* (2013.01); *H04N 1/32229* (2013.01); *H04N 1/32309* (2013.01); *H04N 1/6088* (2013.01)

(58) Field of Classification Search
None
See application file for complete search history.

(56) References Cited

U.S. PATENT DOCUMENTS

| 4,851,923 A * | 7/1989 | Abe .......................... G06T 3/60 358/296 |
|---|---|---|
| 6,352,806 B1 | 3/2002 | Dalal |
| 7,639,400 B2 | 12/2009 | Hains |
| 8,310,718 B2 | 11/2012 | Chapman et al. |
| 8,675,259 B2 | 3/2014 | Chapman et al. |
| 8,730,527 B2 | 5/2014 | Chapman et al. |
| 9,148,546 B2 | 9/2015 | Miller et al. |
| 9,541,882 B2 | 1/2017 | Yukie et al. |
| 9,614,995 B1 | 4/2017 | Chapman |
| 9,628,662 B1 | 4/2017 | Emmett et al. |
| 9,661,186 B1 | 5/2017 | Chapman |
| 9,674,392 B1 | 6/2017 | Chapman |
| 9,781,294 B1 | 10/2017 | Chapman |
| 10,009,503 B1 | 6/2018 | Chapman |
| 10,237,442 B2 | 3/2019 | Chapman et al. |
| 2008/0192297 A1* | 8/2008 | Wang ................... H04N 1/4058 358/3.06 |
| 2010/0128321 A1* | 5/2010 | Wang ................... H04N 1/4058 358/3.28 |
| 2010/0196069 A1 | 8/2010 | Dirubio et al. |
| 2014/0078535 A1* | 3/2014 | Okada ................... G06F 3/0485 358/1.13 |
| 2017/0060047 A1* | 3/2017 | Unagida .............. G03G 15/234 |
| 2017/0064150 A1* | 3/2017 | Moribe ............... H04N 1/6019 |
| 2017/0324882 A1 | 11/2017 | Chapman |
| 2018/0063347 A1 | 3/2018 | Conlon et al. |

* cited by examiner

*Primary Examiner* — Scott A Rogers
(74) *Attorney, Agent, or Firm* — Ortiz & Lopez, PLLC; Kermit D . Lopez; Luis M. Ortiz

(57) ABSTRACT

A method and system for rendering a gloss effect image on a recording medium, can involve creating with a processor, a mirror of a gloss effect image of a gloss mark located on a front side of a recording medium, and rendering with a color printer having marking materials, the mirror of the gloss effect image on a back side of the recording medium directly opposite the gloss mark located on the front side of the recording medium. The processor can include a digital front processor that communicates with the color printer. The gloss effect image of the gloss mark can be, for example, a micro gloss feature or a macro gloss feature.

20 Claims, 9 Drawing Sheets

MIRROR OF GLOSS EFFECT IMAGE OF GLOSS MARK RENDERED ON BACKSIDE OF MEDIUM

TECHNICAL FIELD

Embodiments are related to printing devices and techniques. Embodiments further relate to security for printed documents and anti-counterfeiting techniques. Embodiments additionally relate to specialty imaging devices, systems and methods. Embodiments further relate to techniques and devices for rendering a gloss effect image on a recording medium using a digital front end processor and a color printer having color marking materials.

BACKGROUND

In conventional printing processes, requiring security measures, a pattern color space having specialty imaging characteristics have been utilized to provide the security measures and prevent counterfeiting of printed materials. In addition, in conventional printing processes, a pattern color space has been utilized, in part on variable data, such as printing logos, serial numbers, seat locations, or other types of unique identifying information on printed materials.

In security applications, it may be desirable to add information to a document that prevents or hinders alterations and counterfeiting. These security elements may conflict with the overall aesthetics of the document. Specialty imaging has been used, conventionally, in printed materials to provide fraud protection and anti-counterfeiting measures. Some examples are in prescriptions, contracts, documents, coupons, and tickets. Typically, several specialty imaging techniques can be used at various positions in a document.

Thus, in the area of security printing, documents may be protected from copying, forging and counterfeiting using multiple techniques. Specialty Imaging is one such method of security printing, which uses standard materials such as papers inks and toners. Typically security-printing companies in the marketplace may require special (and expensive) materials. An example document is a prescription where a pharmacist would like to be able to possess a high level of confidence that a document is genuine.

MacroGloss and MicroGloss (or Artistic Black for VIPP) are two specialty imaging techniques. MacroGloss and MicroGloss are examples of gloss effect images. MacroGloss and MicroGloss do not require a special tool (e.g., UV light) to view and are especially strong in anti-copying. They use a pair of colors, which appear about the same when viewing straight on but show a differential gloss when tilting due to the pile height of the toner or ink. FIG. 1 and FIG. 2 demonstrate an example of each.

MicroGloss uses a pair of colors, which appear about the same when viewing straight on but display a differential gloss when tilting due to the pile height of the toner or ink. FIG. 1 illustrates an image 10 of an example MicroGloss product. Note typically the entire black rectangle of MicroGloss as shown in image 10 would be visible under office illumination. For the example image 10 shown in FIG. 1, a small LED was the light source and visibility depends on the angle of the light source and the viewer.

MicroGloss is a current product of Xerox® Corporation and is used in production and office equipment. One can see from FIG. 1 that portions of the UPMC logo shown in image 10 in FIG. 1 exhibit the gloss effect (seen at an angle) and other parts do not (seen straight on). The small text, however, is actually present in the entire UPMC logo and black box.

FIG. 2 illustrates an image 12 of an example of an example MacroGloss product. In the image 12 shown in FIG. 2, the text "MACROGLOSS" is depicted as disposed on each line of the black rectangle.

FIG. 3 illustrates a schematic diagram 20, which demonstrates that the gloss effect can be based on the angles 24 of the light source 22, the observer 26 and one or more sample angles. This is true for MacroGloss, MicroGloss and other gloss effects such as GlossMare®. Examples of MicroGloss and other specialty imaging techniques such as GlossMare® are disclosed in U.S. Patent Application Publication No. 20170324882, entitled "System and Method for Producing Seesaw Gloss Effect and Recording Medium Seesaw Gloss Effect" which published to Edward Chapman on Nov. 9, 2017 and is incorporated herein by reference in its entirety. Other examples of MicroGloss and specialty imaging techniques are disclosed in U.S. Pat. No. 9,781,294 entitled "System and Method for Rendering Micro Gloss Effect Image Patterns on a Recording Medium", which issued to Edward Chapman on Oct. 3, 2017 and is incorporated herein by reference in its entirety.

The MicroGloss (or Artistic Black) product is based on two colors appearing about the same. One has a high and the other low toner height. A differential gloss occurs between the two when tilting. It has two reasons it must be used at small sizes. The first becomes visible without tilting when a font size larger of around 7-9 points (e.g., ⅛ inch) is used. The second uses a large area at or near the ink limit, which can cause issues such as not fusing correctly.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved anti-counterfeiting rendering techniques and devices.

It another aspect of the disclosed embodiments to provide for improved specialty imaging devices, systems and methods.

It is a further aspect of the disclosed embodiments to provide for methods, systems and devices for rendering a gloss effect image on a recording medium using a DFE processor and a color printer having color marking materials.

The aforementioned aspects and other objectives and advantages can now be achieved as described herein. In an embodiment, a method for rendering a gloss effect image on a recording medium, can include: creating with a processor, a mirror of a gloss effect image of a gloss mark located on a front side of a recording medium; and rendering with a color printer having marking materials, the mirror of the gloss effect image on a back side of the recording medium directly opposite the gloss mark located on the front side of the recording medium.

In an embodiment of the method, the processor can comprise a digital front processor that communicates with the color printer.

In an embodiment of the method, the gloss effect image of the gloss mark can comprise a micro gloss feature.

In an embodiment of the method, the gloss effect image of the gloss mark can comprise a macro gloss feature.

An embodiment of the method can further involve performing a front to back registration correction with respect to the gloss effect image.

In an embodiment of the method, the recording medium can comprise a substrate.

In an embodiment of the method, the recording medium can comprise a sheet of paper.

In an embodiment, a system for rendering a gloss effect image on a recording medium, can include at least one processor and a memory, the memory storing instructions to cause the at least one processor to perform: creating a mirror of a gloss effect image of a gloss mark located on a front side of a recording medium; and rendering with a color printer having marking materials, the mirror of the gloss effect image on a back side of the recording medium directly opposite the gloss mark located on the front side of the recording medium.

In an embodiment of the system, the at least one processor can comprise a digital front processor that communicates with the color printer.

In an embodiment of the system, the gloss effect image of the gloss mark can comprise a micro gloss feature.

In an embodiment of the system, the gloss effect image of the gloss mark can comprise a macro gloss feature.

In an embodiment of the system, the instructions can further comprise instructions for performing a front to back registration correction with respect to the gloss effect image.

In an embodiment of the system, the recording medium can comprise a substrate.

In an embodiment of the system, the recording medium can comprise a sheet of paper.

In an embodiment, an article can comprise a mirror of a gloss effect image of a gloss mark located on a front side of a recording medium, wherein the mirror of the gloss effect image is rendered on a back side of the recording medium directly opposite the gloss mark located on the front side of the recording medium.

In an embodiment of the article, the gloss effect image of the gloss mark can comprise a micro gloss feature.

In an embodiment of the article, the gloss effect image of the gloss mark comprises a macro gloss feature.

In an embodiment of the article, a front to back registration correction can be performed with respect to the gloss effect image.

In an embodiment of the article, the recording medium can comprise a substrate.

In an embodiment of the article, the recording medium can comprise a sheet of paper.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
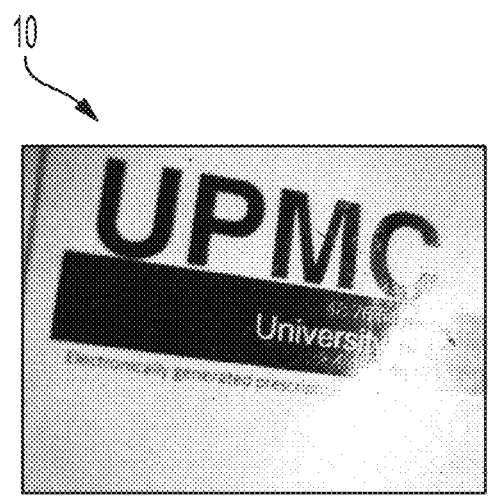
FIG. 1 illustrates an image of an example MicroGloss product.
Figure 2:
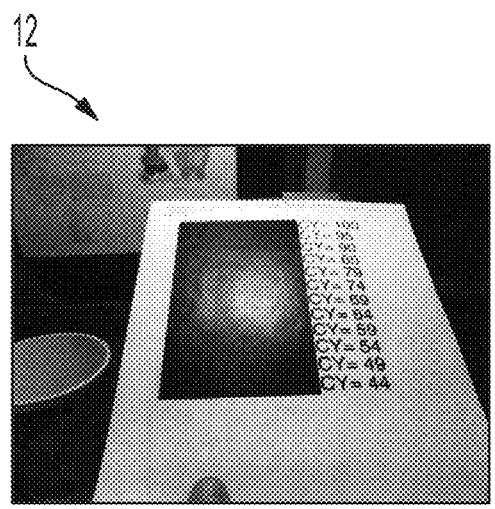
FIG. 2 illustrates an image of an example of an example MacroGloss product.
Figure 3:
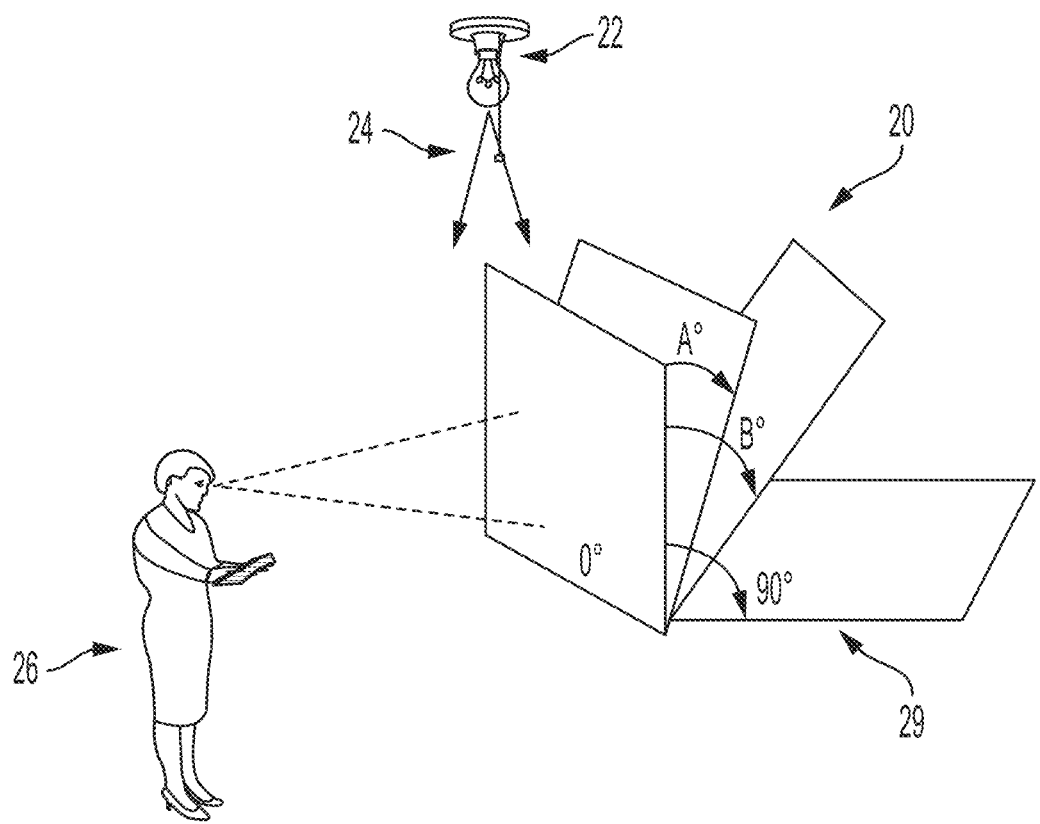
FIG. 3 illustrates a schematic diagram, which demonstrates that the gloss effect is based on the angles of the light source, the observer and one or more sample angles.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image.

The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An operation can perform "image processing" when it operates on an item of data that relates to part of an image.

"Contrast" is used to denote the visual difference between items, data points, and the like. It can be measured as a color difference or as a luminance difference or both.

A digital color printing system is an apparatus arrangement suited to accepting image data and rendering that image data upon a substrate such as paper, textile, metal, etc.

The "RGB color model" is an additive color model in which red, green, and blue can be added together in various ways to reproduce a broad array of colors. The name of the model comes from the initials of the three additive primary colors, red, green, and blue.

A primary purpose of the RGB color model is for the sensing, representation, and display of images in electronic systems. RGB is a device-dependent color model: different devices detect or reproduce a given RGB value differently, since the color elements and their response to the individual R, G, and B levels vary from manufacturer to manufacturer, or even in the same device over time. Thus, an RGB value does not define the same color across devices without some kind of color management.

The "CMYK color model" is a subtractive color model, which can be used in color printing, and can also be used to describe the printing process itself. CMYK refers to the four inks used in some color printing: cyan, magenta, yellow, and black.

"Colorant" can refer to one of the fundamental subtractive C, M, Y, K, primaries, which may be realized in formulation as, liquid ink, solid ink, dye, or electrostatographic toner. A "colorant mixture" is a particular combination of C, M, Y, K colorants.

An "infrared mark" is a watermark embedded in the image that has the property of being relatively indecipherable under normal light, and yet decipherable under infrared illumination by appropriate infrared sensing devices, such as infrared cameras.

"Metameric" rendering/printing is the ability to use multiple colorant combinations to render a single visual color, as can be achieved when printing with more than three colorants.

Figure 4:
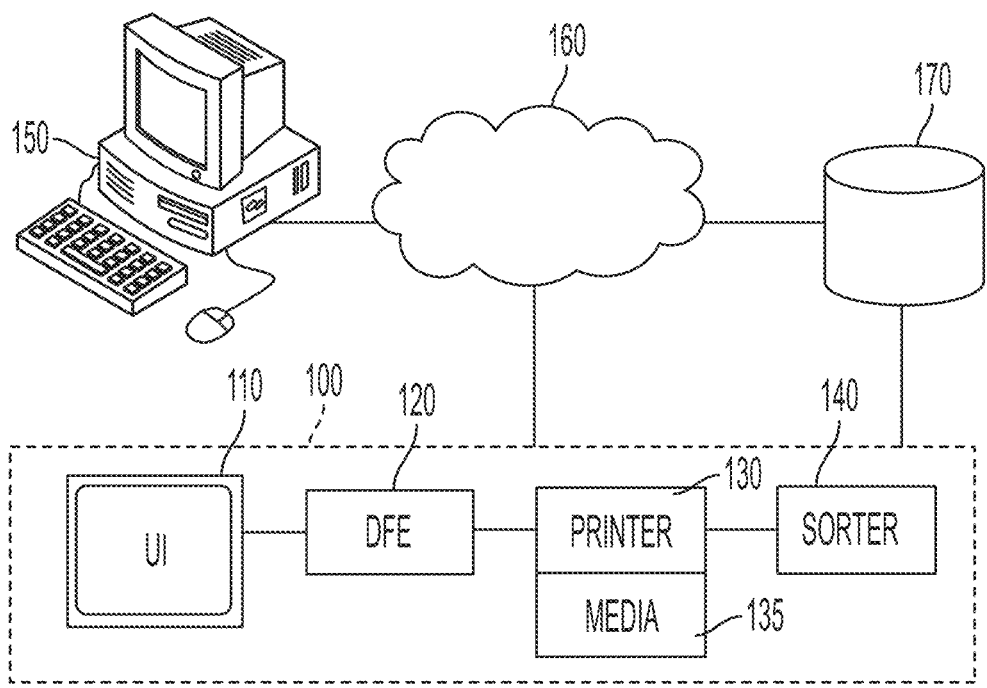
FIG. 4 illustrates a block diagram of a printing system suitable for implementing one or more of the disclosed embodiments.

With reference to FIG. 4, a printing system (or image rendering system) 100 suitable for implementing various aspects of the exemplary embodiments described herein is illustrated.

The word "printer" and the term "printing system" as used herein encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 100 can include a user interface 110, a digital front end (DFE) controller 120, and at least one print engine 130. The print engine 130 has access to print media 135 of various sizes and cost for a print job. The printing system 100 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data is generally sent to the printing system 100.

A sorter 140 can operate after a job is printed by the print engine 130 to manage arrangement of the hard copy output, including cutting functions. A user can access and operate the printing system 100 using the user interface 110 or via a data-processing system such as a workstation 150. The workstation 150 can communicate bidirectionally with the printing system 100 via a communications network 160.

A user profile, a work product for printing, a media library, and various print job parameters can be stored in a database or memory 170 accessible by the workstation 150 or the printing system 100 via the network 160, or such data can be directly accessed via the printing system 100. One or more color sensors (not shown) may be embedded in the printer paper path, as known in the art.

Figure 5:
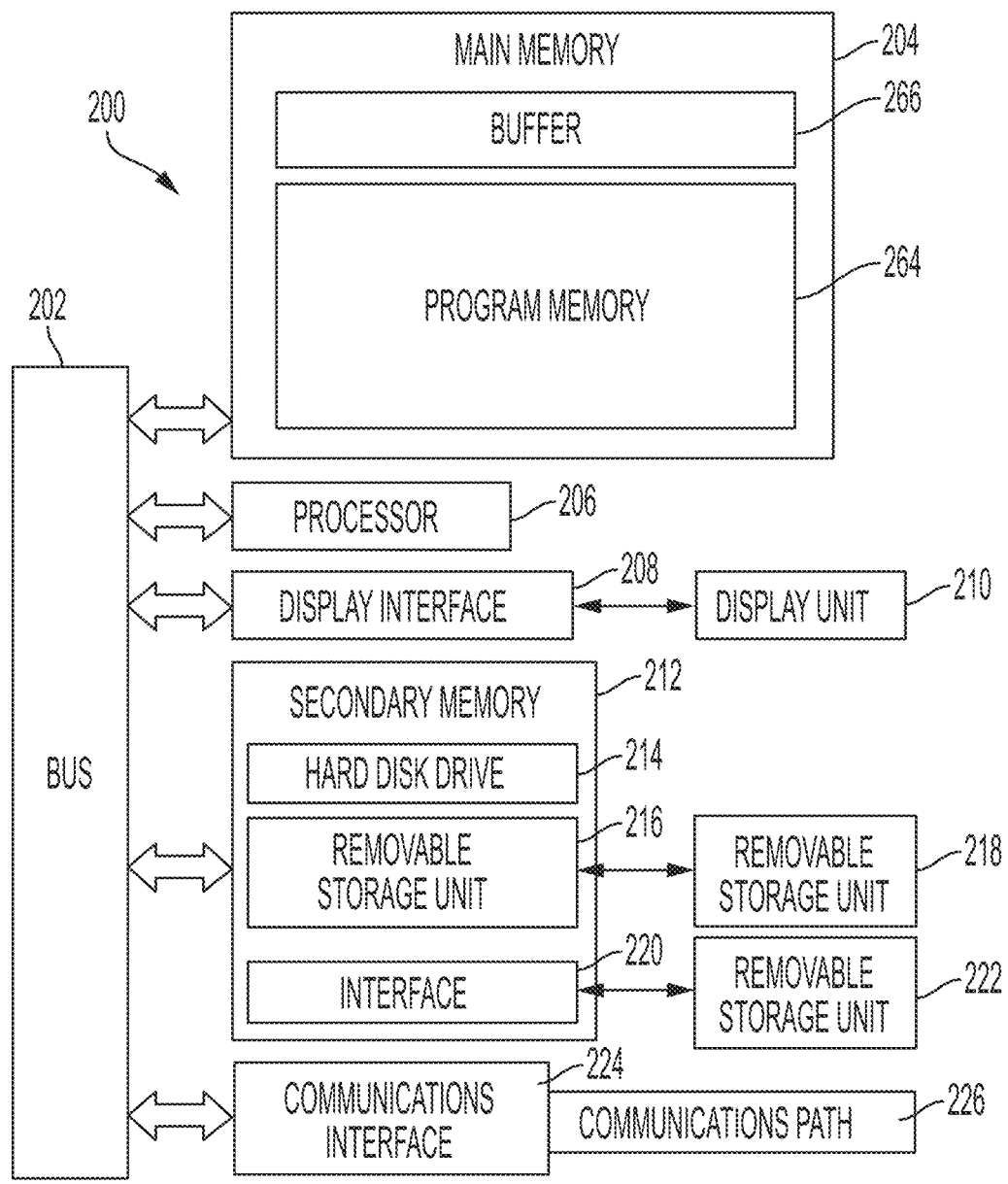
FIG. 5 illustrates a block diagram of a digital front end controller useful for implementing one or more of the disclosed embodiments.

With respect to FIG. 5, an exemplary DFE controller 200 is shown in greater detail. The digital front end 200 can include one or more processors, such as processor 206 capable of executing machine executable program instructions. The processor 206 can function as a DFE processor.

In the embodiment shown, the processor 206 can be in communication with a bus 202 (e.g., a backplane interface bus, cross-over bar, or data network). The digital front end 200 can also include a main memory 204 that is used to store machine readable instructions. The main memory 204 is also capable of storing data. The main memory 204 may alternatively include random access memory (RAM) to support reprogramming and flexible data storage. A buffer 266 can be used to temporarily store data for access by the processor 206.

Program memory 264 can include, for example, executable programs that implement the embodiments of the methods described herein. The program memory 264 can store at least a subset of the data contained in the buffer.

The digital front end 200 can include a display interface 208 that forwards data from communication bus 202 (or from a frame buffer not shown) to a display 210. The digital front end 200 can also include a secondary memory 212 includes, for example, a hard disk drive 214 and/or a removable storage drive 216, which reads and writes to removable storage 218, such as a floppy disk, magnetic tape, optical disk, etc., that stores computer software and/or data.

The secondary memory 212 alternatively may include other similar mechanisms for allowing computer programs or other instructions to be loaded into the computer system. Such mechanisms can include, for example, a removable storage unit 222 adapted to exchange data through interface 220. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end 200 can include a communications interface 224, which acts as both an input and an output to allow software and data to be transferred between the digital front end 200 and external devices. Examples of a communications interface include a modem, a network interface (such as an Ethernet card), a communications port, a PCM-CIA slot and card, etc.

Computer programs (also called computer control logic) and including one or more modules may be stored in the main memory 204 and/or the secondary memory 212. Computer programs or modules may also be received via a communications interface 224. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data generally stored in secondary memory 212 for access during an DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded, but may be optionally created inside the DFE in a so-called characterization step.

As discussed earlier MacroGloss and MicroGloss are types of gloss effect marks or features and can be based on a metameric pair of colors appearing about the same color at one angle. One has a high toner height and the other a low toner height. A differential gloss can occur between the two when tilting. To be considered working, it should possess a gloss effect at one angle and be hidden (i.e., "hiding") at another angle.

To address this problem, the disclosed approach allows MGh be the high toner stack and MGl be the low toner stack. When an MGh area is to be placed on a page, a translated and mirrored MGl can be placed on the back side of the page directly underneath the MGh area. When an MGl area is to be placed on a page, a translated and mirrored MGh can be placed on the back side of the page directly underneath the MGl area. This approach can improve the hiding between MGh and MGl especially in back lit situations which is the typical way to view Micro and MacroGloss.

Thus, security features such as MicroGloss and MacroGloss along with GlossMark can be improved by rendering a mirror of the gloss effect on the back side of the media (e.g., a recording medium) directly opposite the gloss marks on the front side of the media. A benefit of this approach is that the resulting security feature can be more obfuscated especially when viewing by back lighting the content.

In the some of the descriptions below, specialty imaging elements can be used in a dynamic pattern generation process to provide security features.

The disclosed embodiments can implement steps, operations or instructions as follows:

1) Define a background region on the front side of a media;
2) Paint region in metameric pair MG1 (high or low);
3) Define a foreground region on the front side of a media;
4) Paint region in metameric pair ink MG2 (the other ink);
5) Save procedure steps 1-4;
6) Go to back side of media;
7) Execute a mirror procedure based on page dimensions; and
8) Call procedure from step 5 with MG1 and MG2 swapped.

Figure 6:
FIG. 6 illustrates an image of an example MicroGloss watermark with a background and a textbox and foreground text, in accordance with an embodiment.

FIG. 6 illustrates an image 32 of an example MicroGloss watermark with a background and a textbox and foreground text, in accordance with an embodiment. Steps 1-4 described above can result in a MicroGloss watermark with the background a textbox and foreground text. FIG. 6 thus illustrates an example where a textbox shown in black can be painted with MG1 and the text can be painted with MG2 (which can be shown in red in color drawings, which are not included with the black and white drawings included with this patent application) opaquely over the textbox. A real MicroGloss can appear as one color so that the red would really be black.

Figure 7:
FIG. 7 illustrates an image of a back side mirrored MicroGloss, in accordance with an embodiment.

FIG. 7 illustrates an image of a back side mirrored MicroGloss, in accordance with an embodiment. In the example depicted in FIG. 7, not only are the text and textbox mirrored, but also the x axis is mirrored on the page width. For example, if the front side watermark started one inch from the left side of the page the back side watermark starts one inch from the right side of the page so the front and back sides are aligned directly on top of each other.

Figure 8:
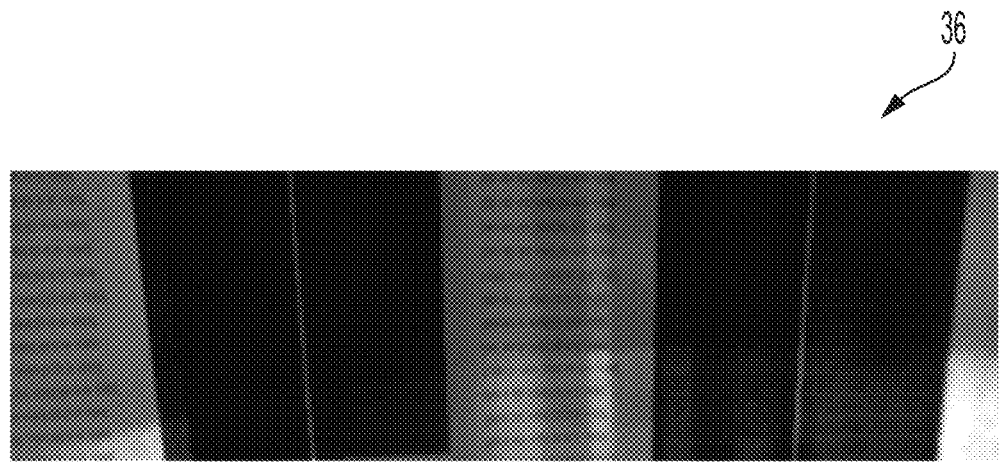
FIG. 8 illustrates an image of an improved MicroGloss, in accordance with an embodiment.

FIG. 8 illustrates an image 36 of an improved MicroGloss, in accordance with an embodiment. The right side of the image 36 is the original and the left side is the improved MicroGloss. It is backlit on the bottom rows. It is easier to read than the original.

Figure 9:
FIG. 9 illustrates another image of an improved MicroGloss, in accordance with an embodiment.

FIG. 9 illustrates another image 38 of an improved MicroGloss, in accordance with an embodiment. The right side of the image 38 is the original and the left side is the improved MicroGloss. In the example depicted in FIG. 9, the improved MicroGloss is on a desk so that is not backlit, but still improves the hiding. It may be necessary to zoom in to see the features clearly.

Figure 10:
FIG. 10 illustrates an image of an example ticket that can implement an improved MicroGloss and/or MacroGloss, in accordance with an embodiment.

FIG. 10 illustrates an image 40 of an example ticket that can implement an improved MicroGloss and/or MacroGloss, in accordance with an embodiment. It should be appreciated that a limited number of cases can be implemented where features for gloss marks match up for front to back of pages. The marks themselves can appear in mirror on the second side and may be less readable for text.

The intent is not to have MicroGloss or MacroGloss effects on the back but to provide better "hiding" capabilities. The mirrored data may be implemented only to provide an even toner stack when the front and back are added together. This can provide a small improvement compared to a solid black rectangle. If the mirrored text is not desired by a customer, the rectangle can be used.

The disclosed approach thus can increase the amount of supplies usage if large background regions are printed on the second side. MicroGloss is normally used at very small sizes as part of a series of specialty imaging effects so not true. For example, the Xerox Rochester International Jazz Festival tickets used MicroGloss only in the black JA in the ticket example depicted in image 40 in FIG. 10. For most uses of MicroGloss, the disclosed approach presents a preferred method. For MacroGloss, however, this may not be true as it may be used on larger areas.

It can be appreciated, however, that the disclosed approach may be sensitive to miss-registration front to back. The front to back registration may cause a problem. In this case, it may be helpful when printing front and back where alignment matters to implement a step such as Step 2 of U.S. patent application Ser. No. 16/423,645, entitled "Vector Pattern MacroGloss," which was filed on May 28, 2019 is incorporated herein by reference in its entirety.

Figure 11:
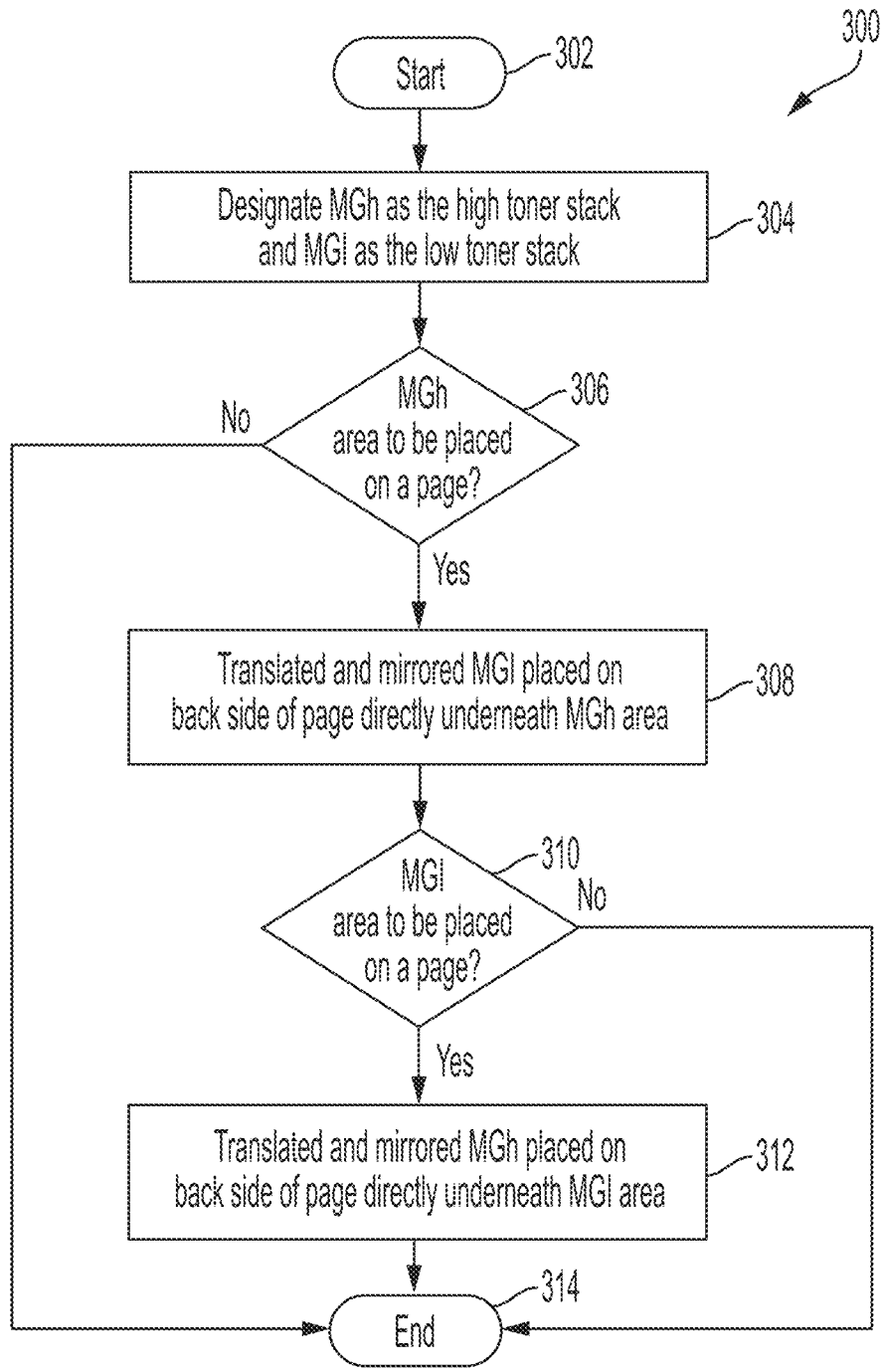
FIG. 11 illustrates a flow chart of operations depicting logical operational steps of a method for rendering a gloss effect mark on a recording medium, in accordance with an embodiment.

FIG. 11 illustrates a flow chart of operations depicting logical operational steps of a method 300 for rendering a gloss effect mark on a recording medium, in accordance with an embodiment. The method 300 can be implemented with a processor such as a DFE processor, a color printer, and the aforementioned recording medium (e.g., a page, sheet of paper, substrate, etc). The method 300 can be used to create with the processor, a mirror of a gloss effect image of a gloss mark located on the front side of the recording medium, and then rendering with a color printer having marking materials, the mirror of the gloss effect image on the back side of the recording medium directly opposite the gloss mark located on the front side of the recording medium.

As shown at block 302, the process can be initiated. Thereafter, as indicated at block 304, a step or operation can be implemented in which MGh can be designated as the high toner stack and MGl can be designated as the low toner stack. When an MGh area is to be placed on a page, as indicated at decision block 306, a translated and mirrored MGl can be placed on the back side of the page directly underneath the MGh area, as shown at block 308. Note that the operation shown at block 308 (i.e., the step of front to back registration correction) can include more than simply a translate operation. That is, the operation depicted at block 308 can also include some rotation, scale, and shear.

Next, when an MGl area is to be placed on a page, as shown at decision block 310, a translated and mirrored MGh can be placed on the back side of the page directly underneath the MGl area, as illustrated at block 312. The process can then end, as shown at block 314. The method 300 can thus improve the hiding between MGh and MGl especially in back lit situations, which is the typical way to view MicroGloss and MacroGloss.

Figure 12:
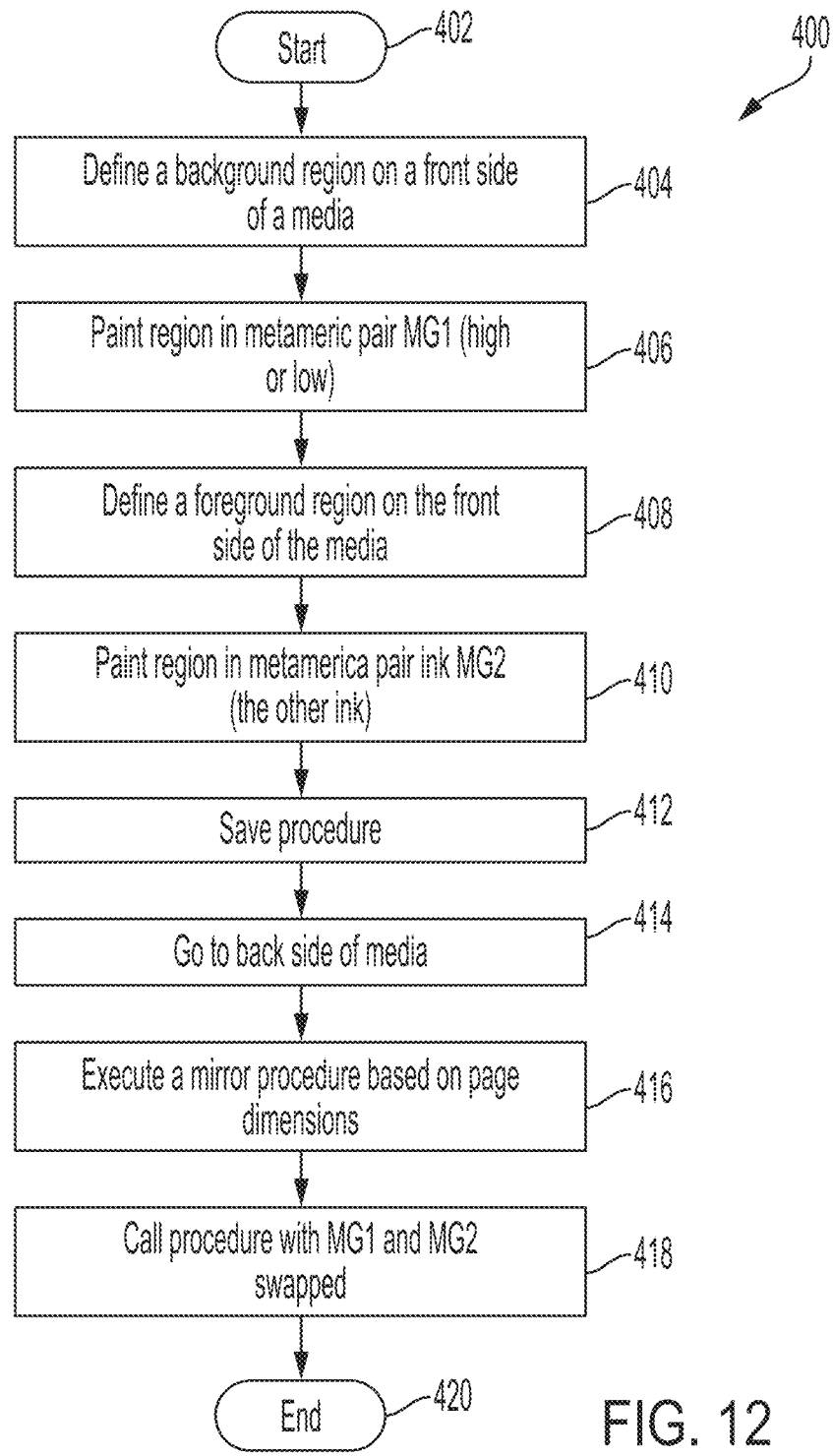
FIG. 12 illustrates a flow chart of operations depicting logical operational steps of a method for rendering a gloss effect mark on a recording medium, in accordance with another embodiment.

FIG. 12 illustrates a flow chart of operations depicting logical operational steps of a method 400 for rendering a gloss effect mark on a recording medium, in accordance with another embodiment. As shown at block 402, the process can begin. Next, as indicated at block 404, a step or operation can be implemented to define the back region on the front side of a media (e.g., a recording medium). Thereafter, as depicted at block 406, a step or operation can be implemented to paint a region in metameric pair MG1 (high or low). Then, as illustrated at block 408, a step operation can be implemented to define a foreground region on the front side of the media. Next, as depicted at block 410, a step or operation can be implemented to paint a region in metameric pair ink MG2 (the other ink).

Thereafter, as shown at block 412, a step or operation can be implemented to save the procedure depicted at block 404, block 406, block 408, and 410. Then, as shown at block 414, a step or operation can be implemented to go to the back side of the media, and thereafter, as depicted at block 416, execute a mirror procedure on the page dimensions. Next, as described at block 418 a step or operation can be performed to call the saved procedure (see block 412) with MG1 and MG2 swapped. The process can then end, as shown at block 420.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 100 shown in FIG. 4 and/or the DFE controller 200 shown in FIG. 5. A "module" can perform the various steps, operations or instructions discussed herein, such as the steps or operations discussed herein with respect to FIG. 11 and FIG. 12.

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the disclosed embodiments. The claimed solution may be rooted in computer technology in order to overcome a problem specifically arising in the realm of computers, computer networks and call center platforms.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a gloss effect image on a recording medium, comprising:
   creating with a processor, a mirror of a gloss effect image of a gloss mark located on a front side of a recording medium; and
   rendering with a color printer having marking materials, the mirror of the gloss effect image on a back side of the recording medium directly opposite the gloss mark located on the front side of the recording medium.

2. The method of claim 1 wherein the processor comprises a digital front processor that communicates with the color printer.

3. The method of claim 1 wherein the gloss effect image of the gloss mark comprises a micro gloss feature.

4. The method of claim 1 wherein the gloss effect image of the gloss mark comprises a macro gloss feature.

5. The method of claim 1 further comprising performing a front to back registration correction with respect to the gloss effect image.

6. The method of claim 1 wherein the recording medium comprises a substrate.

7. The method of claim 1 wherein the recording medium comprises a sheet of paper.

8. A system for rendering a gloss effect image on a recording medium, comprising:
   at least one processor and a memory, the memory storing instructions to cause the at least one processor to perform:
   creating a mirror of a gloss effect image of a gloss mark located on a front side of a recording medium; and
   rendering with a color printer having marking materials, the mirror of the gloss effect image on a back side of the recording medium directly opposite the gloss mark located on the front side of the recording medium.

9. The system of claim 8 wherein the at least one processor comprises a digital front processor that communicates with the color printer.

10. The system of claim 8 wherein the gloss effect image of the gloss mark comprises a micro gloss feature.

11. The system of claim 8 wherein the gloss effect image of the gloss mark comprises a macro gloss feature.

12. The system of claim 8 wherein the instructions further comprise instructions for performing a front to back registration correction with respect to the gloss effect image.

13. The system of claim 8 wherein the recording medium comprises a substrate.

14. The system of claim 8 wherein the recording medium comprises a sheet of paper.

15. An article, comprising:
   a mirror of a gloss effect image of a gloss mark located on a front side of a recording medium, wherein the mirror of the gloss effect image is rendered on a back side of the recording medium directly opposite the gloss mark located on the front side of the recording medium.

16. The article of claim 15 wherein the gloss effect image of the gloss mark comprises a micro gloss feature.

17. The article of claim 15 wherein the gloss effect image of the gloss mark comprises a macro gloss feature.

18. The article of claim 15 wherein a front to back registration correction is performed with respect to the gloss effect image.

19. The article of claim 15 wherein the recording medium comprises a substrate.

20. The article of claim 15 wherein the recording medium comprises a sheet of paper.

* * * * *